(12) United States Patent
Ino (10) Patent No.: US 12,405,453 B2
(45) Date of Patent: Sep. 2, 2025

(54) OPTICAL SYSTEM AND IMAGING APPARATUS INCLUDING THE SAME

(71) Applicant: CANON KABUSHIKI KAISHA, Tokyo (JP)

(72) Inventor: Tomohiro Ino, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 256 days.

(21) Appl. No.: 18/151,809

(22) Filed: Jan. 9, 2023

(65) Prior Publication Data

US 2023/0236394 A1 Jul. 27, 2023

(30) Foreign Application Priority Data

Jan. 24, 2022 (JP) ................. 2022-008836

(51) Int. Cl.
 *G02B 13/02* (2006.01)
 *G02B 9/64* (2006.01)
 *G02B 27/64* (2006.01)

(52) U.S. Cl.
 CPC ............. *G02B 13/02* (2013.01); *G02B 9/64* (2013.01); *G02B 27/646* (2013.01)

(58) Field of Classification Search
 CPC ......... G02B 13/02; G02B 27/646; G02B 9/12
 USPC ............. 359/745, 784, 786, 787, 7, 88, 788
 See application file for complete search history.

(56) References Cited

U.S. PATENT DOCUMENTS

| 2013/0100337 A1 | 4/2013 | Eguchi |
| 2013/0194487 A1 | 8/2013 | Eguchi |
| 2016/0341958 A1* | 11/2016 | Eguchi ..................... G02B 9/26 |
| 2018/0143409 A1 | 5/2018 | Mori |
| 2018/0164540 A1* | 6/2018 | Kawamura .......... G02B 15/143 |

(Continued)

FOREIGN PATENT DOCUMENTS

| JP | 2012189679 A | 10/2012 |
| JP | 2016218276 A | 12/2016 |

(Continued)

OTHER PUBLICATIONS

Gross, H., Zugge, H., Peschka, M. and Blechinger, F., Handbook of Optical Systems, 2006, Wiley-VCH, vol. 3: Aberration Theory and Correction of Optical Systems, 215-221, 229-230 (Year: 2006).*

(Continued)

*Primary Examiner* — Bumsuk Won
*Assistant Examiner* — Alex Park Rickel
(74) *Attorney, Agent, or Firm* — Canon U.S.A., Inc. IP Division (57) ABSTRACT

An optical system includes a first unit having positive refractive power, a second unit having positive or negative refractive power and configured to move in focusing, and a third unit having negative refractive power in order from an object side to an image side. A distance between adjacent two of the units changes in focusing. When a distance on an optical axis from a lens surface closest to the object side to a lens surface closest to the image side is TL, a distance on the optical axis from a lens surface closest to the object side to a lens surface closest to the image side in the third unit is TL3, a sum of thicknesses, on the optical axis, of lenses in the third unit is SD3, and the largest of the thicknesses of the lenses in the third unit is DM3, the optical system satisfies predetermined conditional inequalities.

16 Claims, 9 Drawing Sheets

(56) References Cited

U.S. PATENT DOCUMENTS

| | | | |
|---|---|---|---|
| 2018/0259690 A1* | 9/2018 | Yasui | G02B 13/02 |
| 2019/0094496 A1* | 3/2019 | Miyagishima | G02B 13/004 |
| 2019/0265503 A1* | 8/2019 | Saito | G02B 9/34 |
| 2020/0033562 A1* | 1/2020 | Tomioka | G02B 7/04 |
| 2021/0055530 A1* | 2/2021 | Miwa | G02B 27/4205 |
| 2023/0152556 A1* | 5/2023 | Ohtake | G02B 9/64 |
| | | | 359/784 |

FOREIGN PATENT DOCUMENTS

| | | |
|---|---|---|
| JP | 2018146879 A | 9/2018 |
| JP | 2023107573 A | 8/2023 |
| WO | 2021/220612 A1 | 11/2021 |

OTHER PUBLICATIONS

Gross H; "Handbook of Optical Systems;" vol. 3: Aberration Theory and Correction of Optical Systems; Wiley-VCH, Weinheim, DE; Jan. 1, 2007; pp. 215-221, 225.

Warren J. Smith; "Modern Lens Design—A Resource Manual;" Jan. 1, 1992; McGraw-Hill, Inc.; pp. 5-27.

* cited by examiner

OPTICAL SYSTEM AND IMAGING APPARATUS INCLUDING THE SAME

BACKGROUND

Field

The present invention relates to an optical system, and in particular to an optical system suitable for imaging apparatuses such as a video camera, a digital still camera, a broadcasting camera, and a monitoring camera.

Description of the Related Art

A telephoto optical system used for an imaging apparatus is demanded to have a long focal length and a small F-number (a large aperture). Japanese Patent Application Laid-Open Nos. 2016-218276 and 2012-189679 each discuss an optical system including a first lens unit having positive refractive power, a second lens unit having positive or negative refractive power and configured to move in focusing, and a third lens unit having positive or negative refractive power that are arranged in order from an object side to an image side.

There is also a demand for the telephoto optical system to satisfactorily correct various aberrations such as chromatic aberration and spherical aberration while achieving reduction in size and weight. However, in a case where the telephoto optical system is configured to have a large aperture, an effective diameter of a lens disposed on the object side is particularly increased, which makes it difficult to achieve the reduction of size and weight of the entire system. To meet the above-described demands, it is important to appropriately set optical arrangement of the lens units included in the optical system, refractive power and arrangement of lenses included in each of the lens units, and the like.

SUMMARY

According to an aspect of the present invention, an optical system includes a first lens unit having positive refractive power, a second lens unit having positive or negative refractive power and configured to move in focusing, and a third lens unit having negative refractive power that are arranged in order from an object side to an image side. A distance between adjacent two of the lens units changes in focusing. The optical system satisfies the following conditional inequalities:

$$0.10 < TL3/TL < 0.40,$$

$$0.70 < SD3/TL3 < 0.90, \text{ and}$$

$$0.05 < DM3/TL3 < 0.14,$$

where TL is a distance on an optical axis from a lens surface closest to the object side to a lens surface closest to the image side, TL3 is a distance on the optical axis from a lens surface closest to the object side in the third lens unit to a lens surface closest to the image side in the third lens unit, SD3 is a sum of thicknesses, on the optical axis, of lenses in the third lens unit, and DM3 is the largest of the thicknesses, on the optical axis, of the lenses in the third lens unit.

Further features of the present invention will become apparent from the following description of exemplary embodiments with reference to the attached drawings.

DESCRIPTION OF THE EMBODIMENTS

Exemplary embodiments of the present invention will be described below with reference to the drawings. The drawings may be drawn on scales different from actual scales for convenience. Further, in the drawings, the same members are denoted by the same reference numerals, and repetitive descriptions thereof will be omitted.

FIGS. 1, 3, 5, and 7 are cross-sectional views, including an optical axis, illustrating an optical system L0 at infinity focusing according to first to fourth exemplary embodiments, respectively. In each of the cross-sectional views, the left side is an object side (a front side) and the right side is an image side (a rear side). The optical system L0 according to each of the exemplary embodiments is an imaging optical system used for an imaging apparatus, and an imaging plane of an image sensor is disposed at a position of an image plane IP. The optical system L0 according to each of the exemplary embodiments may be used as a projection optical system in a projection apparatus such as a projector. In this case, a display surface of a display device such as a liquid crystal panel is disposed at the position of the image plane IP.

FIGS. 2, 4, 6, and 8 are aberration diagrams of the optical system L0 at infinity focusing according to the first to fourth exemplary embodiments, respectively. In each of the aberration diagrams, Fno denotes an F-number, and ω denotes an imaging half field angle (degree) determined by paraxial calculation. In each spherical aberration graph, d denotes spherical aberration for a d-line (with a wavelength of 587.56 nm), g denotes spherical aberration for a g-line (with a wavelength of 435.835 nm), C denotes spherical aberration for a C-line (with a wavelength of 656.27 nm), and F denotes spherical aberration for an F-line (with a wavelength of 486.13 nm). In each astigmatism graph, S denotes astigmatism for the d-line on a sagittal image plane, and M denotes astigmatism for the d-line on a meridional image plane. Each distortion graph indicates distortion for the d-line. In each chromatic aberration graph, g denotes magnification chromatic aberration for the g-line, C denotes magnification chromatic aberration for the C-line, and F denotes magnification chromatic aberration for the F-line.

The optical system L0 according to the first exemplary embodiment is a telephoto optical system having an F-number of 5.9 and a half field angle of 1.51 degrees. The optical system L0 according to the second exemplary embodiment is a telephoto optical system having an F-number of 8.0 and a half field angle of 1.05 degrees. The optical system L0 according to the third exemplary embodiment is a telephoto optical system having an F-number of 8.0 and a half field angle of 1.24 degrees. The optical system L0 according to the fourth exemplary embodiment is a telephoto optical system having an F-number of 5.9 and a half field angle of 1.59 degrees.

The optical system L0 according to each of the first to fourth exemplary embodiments includes a first lens unit L1 having positive refractive power, a second lens unit L2 having negative refractive power and configured to move in focusing, and a third lens unit L3 having negative refractive power that are arranged in order from the object side to the image side. In the optical system L0, a distance between adjacent two of the lens units changes in focusing. In other words, the term "lens unit" used herein refers to a set of lenses configured to integrally move in focusing, or a set of lenses configured not to move in focusing. The lens unit is configured to include at least one lens, and may consist of a single lens or a plurality of lenses. The term "lens" used herein refers to an optical element having refractive power, and does not include an optical element having no refractive power such as a parallel plate glass.

Next, characteristics of the optical system L0 according to each of the exemplary embodiments will be described in detail.

Typically, as a total lens length (a distance from a lens surface closest to the object side to the image plane IP) is reduced to downsize the entire optical system L0, various aberrations occur more frequently, in particular, chromatic aberrations (on-axis chromatic aberration and magnification chromatic aberration) occur more significantly. This makes it difficult to achieve high optical performance. In particular, in a case where the total lens length is reduced for the telephoto optical system, chromatic aberrations occur more frequently as the focal length is increased. Further, as the focal length of the optical system is increased, an effective diameter of each of the lenses in the first lens unit L1 having the positive refractive power tends to be large.

To satisfactorily correct various aberrations such as the spherical aberration and the on-axis chromatic aberration while downsizing the entire optical system L0, arranging a large number of lenses in the first lens unit L1 is effective. In the telephoto optical system, however, a lens closer to the object side has a larger effective diameter, and the effective diameter increases as the F-number is reduced. In addition, as the effective diameter of the lens increases, an outer diameter of the lens also increases. As a result, a weight of the lens increases by approximately the cube thereof. Thus, if the number of lenses included in the first lens unit L1 is increased, weight reduction of the entire optical system L is difficult.

To address this, in each of the exemplary embodiments, a configuration of the third lens unit L3 is set appropriately to provide the telephoto optical system that satisfactorily corrects various aberrations while achieving reduction in size and weight. More specifically, the optical system L0 according to each of the exemplary embodiments satisfies the following conditional inequalities (1) to (3). In the conditional inequalities (1) to (3), a distance (a total optical length) on the optical axis from a lens surface closest to the object side to a lens surface closest to the image side is denoted by TL, and a distance on the optical axis from a lens surface closest to the object side in the third lens unit L3 to a lens surface closest to the image side in the third lens unit L3 is denoted by TL3. Further, a sum of thicknesses, on the optical axis, of lenses in the third lens unit L3 is denoted by SD3, and the largest of the thicknesses, on the optical axis, of the lenses in the third lens unit L3 is denoted by DM3.

$$0.10 < TL3/TL < 0.40 \quad (1)$$

$$0.70 < SD3/TL3 < 0.90 \quad (2)$$

$$0.05 < DM3/TL3 < 0.14 \quad (3)$$

The conditional inequality (1) indicates that the total length (thickness) of the third lens unit L3 is sufficiently long relative to the total optical length of the optical system L0. As described above, if a large number of lenses are arranged in the first lens unit L1 in order to achieve both the downsizing of the entire optical system L0 and the correction of various aberrations, the weight of the first lens unit L1 increases. To address this, in each of the exemplary embodiments, a relatively large number of lenses are arranged in the third lens unit L3 to satisfy the conditional inequality (1), thereby making it possible to satisfactorily correct various aberrations while achieving both the downsizing of the entire optical system L0 and the light weight of the first lens unit L1.

If the value TL3/TL is lower than the lower limit of the conditional inequality (1), the total length of the third lens unit L3 is excessively small, which makes it difficult to arrange a sufficient number of lenses in the third lens unit L3 to satisfactorily correct various aberrations. To satisfactorily correct various aberrations using the third lens unit L3, it is important to arrange a large number of lenses on the object side in the third lens unit L3, where a passing position of on-axis light flux is relatively high. However, if the value TL3/TL exceeds the upper limit of the conditional inequality (1), the lenses on the image side in the third lens unit L3 are arranged close to the image plane IP, which makes it difficult to satisfactorily correct various aberrations using the third lens unit L3.

The conditional inequality (2) indicates that the sum of thicknesses of the lenses in the third lens unit L3 is sufficiently large relative to the total length of the third lens unit L3. If the value SD3/TL3 is lower than the lower limit of the conditional inequality (2), the lenses on the image side in the third lens unit L3 are arranged close to the image plane IP, which makes it difficult to satisfactorily correct various aberrations using the third lens unit L3. If the value SD3/TL3 exceeds the upper limit of the conditional inequality (2), distances between the lenses in the third lens unit L3 are excessively small. Then, differences of the on-axis light flux in each of the lenses are small, which makes it difficult to satisfactorily correct various aberrations.

The conditional inequality (3) indicates that the thickness of the thickest lens in the third lens unit L3 is sufficiently small relative to the total length of the third lens unit L3, namely, the thickness of each of the lenses in the third lens unit L3 is sufficiently small. If the value DM3/TL3 exceeds the upper limit of the conditional inequality (3), the thickness of each of the lenses in the third lens unit L3 is excessively large and the number of lenses that can be arranged in the third lens unit L3 is reduced, which makes it difficult to satisfactorily correct various aberrations. If the value DM3/TL3 is lower than the lower limit of the conditional inequality (3), the lenses on the image side in the third lens unit L3 are arranged close to the image plane IP, which makes it difficult to satisfactorily correct various aberrations using the third lens unit L3.

As described above, the optical system L0 according to each of the exemplary embodiments can achieve both the size and weight reduction and the satisfactory correction of various aberrations by satisfying the conditional inequalities (1) to (3) in the configuration including the above-described three lens units.

Numerical value ranges of the conditional inequalities (1) to (3) are desirably set as follows.

$$0.15 < TL3/TL < 0.35 \quad (1a)$$

$$0.71 < SD3/TL3 < 0.85 \quad (2a)$$

$$0.06 < DM3/TL3 < 0.13 \quad (3a)$$

Further, numerical value ranges of the conditional inequalities (1a) to (3a) are more desirably set as follows.

$$0.20 < TL3/TL < 0.30 \quad (1b)$$

$$0.72 < SD3/TL3 < 0.80 \quad (2b)$$

$$0.08 < DM3/TL3 < 0.12 \quad (3b)$$

Further, the optical system L0 according to each of the exemplary embodiments desirably satisfies at least one of the following conditional inequalities (4) to (8).

$$0.45 < LD/f < 0.80 \quad (4)$$

$$0.15 < BF/LD < 0.27 \quad (5)$$

$$-0.50 < f3/f < -0.10 \quad (6)$$

$$73 < vd3P < 97 \quad (7)$$

$$1.85 < nd3N < 2.2 \quad (8)$$

In the conditional inequalities (4) to (8), a distance (a total lens length) on the optical axis from the lens surface closest to the object side to the image plane IP is denoted by LD, and a distance (a back focus) on the optical axis from the lens surface closest to the image side to the image plane IP is denoted by BF. In a case where a parallel plate such as a filter is disposed on an optical path, the back focus indicates an air-equivalent distance of a distance on the optical axis from the lens surface closest to the image side to the image plane IP. Further, a focal length of the optical system L0 at the time (at infinity focusing) when an object at infinity is in focus is denoted by f, and a focal length of the third lens unit L3 is denoted by f3. An Abbe number, based on the d-line, of a lens that has the largest Abbe number based on the d-line among positive lenses included in the third lens unit L3 is denoted by vd3P, and a refractive index, relative to the d-line, of a lens that has the largest refractive index relative to the d-line among negative lenses included in the third lens unit L3 is denoted by nd3N.

The conditional inequality (4) indicates that the total lens length (the sum of the total optical length and the back focus) is sufficiently short relative to the focal length of the optical system L0. If the value LD/f is lower than the lower limit of the conditional inequality (4), the total lens length is excessively short, which makes it difficult to satisfactorily correct the on-axis chromatic aberration and the magnification chromatic aberration.

If the value LD/f exceeds the upper limit of the conditional inequality (4), the total lens length is excessively long, which makes it difficult to downsize a lens barrel (a holding member) holding the optical system L0.

The conditional inequality (5) indicates that the back focus is sufficiently long relative to the total lens length.

If the value BF/LD is lower than the lower limit of the conditional inequality (5), the back focus is excessively short and the third lens unit L3 is disposed close to the image plane IP. Thus, the passing position of the on-axis light flux in the third lens unit L3 is lowered. As a result, it is difficult to satisfactorily correct the spherical aberration and the on-axis chromatic aberration using the third lens unit L3. If the value BF/LD exceeds the upper limit of the conditional inequality (5), the back focus is excessively long and the number of lenses that can be arranged in the optical system L0 is reduced, which makes it difficult to satisfactorily correct various aberrations.

The conditional inequality (6) indicates that an absolute value of the focal length of the third lens unit L3 is sufficiently small relative to the focal length of the entire optical system L0, namely, an absolute value of the refractive power of the third lens unit L3 is sufficiently large (the negative refractive power of the third lens unit L3 is strong). If the value f3/f is lower than the lower limit of the conditional inequality (6), the absolute value of the focal length of the third lens unit L3 is excessively large, namely, the negative refractive power of the third lens unit L3 is excessively weak and a telephoto effect is reduced, which makes it difficult to reduce the total lens length. If the value f3/f exceeds the upper limit of the conditional inequality (6), the absolute value of the focal length of the third lens unit L3 is excessively small, namely, the negative refractive power of the third lens unit L3 is excessively strong, which makes it difficult to satisfactorily correct the spherical aberration and the on-axis chromatic aberration.

The conditional inequality (7) defines an Abbe number of a material of a lens that has the largest Abbe number among the positive lenses included in the third lens unit L3, and particularly indicates a condition to correct the on-axis chromatic aberration more satisfactorily. If the value vd3P is lower than the lower limit of the conditional inequality (7), the Abbe number of each of the positive lenses in the third lens unit L3 is excessively small, which makes it difficult to satisfactorily correct the on-axis chromatic aberration. If the value vd3P exceeds the upper limit of the conditional inequality (7), the Abbe number of each of the positive lenses in the third lens unit L3 is large and the on-axis chromatic aberration can be easily corrected. However, as the Abbe number of an optical material increases, the refractive index of the optical material tends to decrease. Thus, if the value vd3P exceeds the upper limit of the conditional inequality (7), it may be difficult to satisfactorily correct aberrations such as the spherical aberration and comatic aberration.

The conditional inequality (8) defines the refractive index, relative to the d-line, of the lens that has the largest refractive index relative to the d-line among the negative lenses included in the third lens unit L3, and particularly indicates a condition to correct curvature of field more satisfactorily. If the value nd3N is lower than the lower limit of the conditional inequality (8), the refractive index of each of the negative lenses in the third lens unit L3 is excessively small, which makes it difficult to satisfactorily correct the curvature of field. If the value nd3N exceeds the upper limit of the conditional inequality (8), flexibility in selecting materials for the negative lenses in the third lens unit L3 is lowered. More specifically, it is difficult to select a material easily processable as a lens from among materials having a refractive index exceeding the upper limit of the conditional inequality (8), and to stably manufacture the optical system L0 having desired optical performance.

Numerical value ranges of the conditional inequalities (4) to (6) are desirably set as follows.

$$0.46 < LD/f < 0.75 \quad (4a)$$

$$0.17 < BF/LD < 0.26 \quad (5a)$$

$$-0.45 < f3/f < -0.15 \quad (6a)$$

Further, numerical value ranges of the conditional inequalities (4a) to (6a) are more desirably set as follows.

$$0.47 < LD/f < 0.60 \quad (4b)$$

$$0.19 < BF/LD < 0.25 \quad (5b)$$

$$-0.40 < f3/f < -0.20 \quad (6b)$$

In the optical system L0 according to each of the exemplary embodiments, among distances (lens spaces) on the optical axis between adjacent two lenses, the distance between the lens disposed closest to the object side and the lens adjacent thereto is made largest. This makes it possible to reduce the number of lenses arranged on the object side in the first lens unit L1 where the effective diameter tends to be large. As a result, the weight of the optical system L0 can be reduced. Alternatively, any other lens space may be made largest as appropriate. While in the optical system L0, an aperture stop SP that determines the F-number (Fno) by limiting the light flux is disposed between the first lens unit L1 and the second lens unit L2, the aperture stop SP may be disposed at any other position as appropriate.

The optical system L0 according to each of the exemplary embodiments adopts an inner focus method in which the second lens unit L2 is moved to perform focusing. Further, as indicated by an arrow in each of FIGS. 1, 3, 5, and 7, the second lens unit L2 is moved toward the image side in focusing from an infinity side to a short distance side (a closest side) in each of the exemplary embodiments. Further, in each of the exemplary embodiments, the second lens unit L2 consists of one (a single) lens to reduce the weight, which facilitates focusing. Alternatively, the second lens unit L2 may consist of a plurality of lenses as appropriate.

In each of the exemplary embodiments, the configuration in which the second lens unit L2 has the negative refractive power is adopted. Alternatively, a configuration in which the second lens unit L2 has the positive refractive power may be adopted as appropriate. In this case, in focusing from the infinity side to the short distance side, the second lens unit L2 is moved toward the object side. Further, in each of the exemplary embodiments, the first lens unit L1 and the third lens unit L3 are configured not to move in focusing. Alternatively, a configuration in which at least one of the first lens unit L1 and the third lens unit L3 is moved in focusing may be adopted as appropriate.

The third lens unit L3 according to each of the exemplary embodiments includes a first subunit L3A, a second subunit L3B configured to move in a direction containing a component in a direction perpendicular to the optical axis in image blur correction, and a third subunit L3C that are arranged in order from the object side to the image side. The first subunit L3A and the third subunit L3C are configured not to move in the image blur correction, and distances between the subunits do not change in focusing. As described above, a part of the third lens unit L3 having a relatively small effective diameter in the optical system L0 is used as a subunit (an image stabilization unit) for image blur correction, thereby making it possible to reduce the weight of the image stabilization unit and to facilitate the image blur correction.

In each of the exemplary embodiments, the configuration in which the first subunit L3A has the positive refractive power, the second subunit L3B has the negative refractive power, and the third subunit L3C has the negative refractive power is adopted. The configuration in which the first subunit L3A has the positive refractive power makes it possible to collect light incident on the second subunit L3B and reduce the size and weight of the second subunit L3B serving as the image stabilization unit. Further, the configuration in which the third subunit L3C has the negative refractive power makes it possible to enhance the telephoto effect and reduce the total lens length. However, the positive and negative signs of the refractive power of each of the subunits are not limited to those described above. The first subunit L3A may have the negative refractive power, the second subunit L3B may have the positive refractive power, or the third subunit L3C may have the positive refractive power as appropriate.

Further, a configuration in which at least one of the first subunit L3A and the third subunit L3C is moved in the image blur correction may be adopted as appropriate. At this time, the second subunit L3B may be configured not to move in the image blur correction. In other words, the configuration is such that the image blur correction is performed by moving at least one of the first subunit L3A, the second subunit L3B, and the third subunit L3C. Alternatively, the image stabilization unit may be provided in a part of at least one of the first lens unit L1 and the second lens unit L2 as appropriate.

Numeric data corresponding to the first to fourth exemplary embodiments will be indicated below. In each numeric data, when a surface number of an optical surface counted from the object side is denoted by i, r denotes a radius of curvature of the i-th surface, and d denotes an on-axis space (a distance on the optical axis) between the i-th surface and an (i+1)-th surface. Further, nd denotes a refractive index, relative to the d-line, of a medium between the i-th surface and the (i+1)-th surface, and vd denotes an Abbe number, based on the d-line, of the medium. Further, a "focal length" indicates a focal length of the entire optical system L0 at infinity focusing, a "half field angle" indicates an imaging half field angle (degree), and BF indicates an air-equivalent value of the back focus. The Abbe number vd is a value defined by the following expression when the refractive indices relative to the F-line (486.13 nm), the d-line (587.56 nm), and the C-line (656.27 nm) are respectively denoted by nF, nd, and nC.

$$vd=(nd-1)/(nF-nC)$$

[Numeric Data 1]

| Unit mm Surface Data | | | | |
|---|---|---|---|---|
| Surface number | r | d | nd | vd |
| 1 | 154.563 | 14.23 | 1.59522 | 67.7 |
| 2 | 679.967 | 120.54 | | |
| 3 | 94.854 | 14.30 | 1.43700 | 95.1 |
| 4 | −304.998 | 0.17 | | |
| 5 | −287.507 | 1.50 | 1.80610 | 33.3 |
| 6 | 74.518 | 2.79 | | |
| 7 | 74.498 | 11.84 | 1.43700 | 95.1 |
| 8 | ∞ | 17.88 | | |
| 9 | 67.130 | 5.78 | 1.89286 | 20.4 |

-continued

| Surface number | r | d | nd | vd |
|---|---|---|---|---|
| 10 | 126.373 | 1.51 | | |
| 11 | 70.327 | 2.00 | 1.83400 | 37.2 |
| 12 | 40.256 | 10.32 | 1.43700 | 95.1 |
| 13 | 136.385 | 6.96 | | |
| 14(Aperture) | ∞ | 5.00 | | |
| 15 | −565.591 | 1.60 | 1.61800 | 63.4 |
| 16 | 60.054 | 36.49 | | |
| 17 | 100.609 | 1.40 | 1.89286 | 20.4 |
| 18 | 65.895 | 7.56 | 1.51742 | 52.4 |
| 19 | −93.947 | 1.00 | | |
| 20 | 93.499 | 5.02 | 1.80610 | 33.3 |
| 21 | −121.235 | 1.20 | 1.53775 | 74.7 |
| 22 | 36.546 | 5.43 | | |
| 23 | −82.443 | 1.20 | 1.72916 | 54.7 |
| 24 | 68.591 | 3.01 | | |
| 25 | 137.981 | 4.68 | 1.65412 | 39.7 |
| 26 | −1079.970 | 6.25 | | |
| 27 | 71.027 | 10.18 | 1.72047 | 34.7 |
| 28 | −58.536 | 1.50 | 1.80810 | 22.8 |
| 29 | −358.382 | 2.00 | | |
| 30 | 137.275 | 1.40 | 1.92286 | 20.9 |
| 31 | 66.149 | 6.02 | 1.49700 | 81.5 |
| 32 | −67.277 | 4.78 | | |
| 33 | −90.283 | 1.20 | 1.77250 | 49.6 |
| 34 | 21.745 | 10.05 | 1.71736 | 29.5 |
| 35 | −33.233 | 0.55 | | |
| 36 | −25.355 | 1.47 | 1.72916 | 54.7 |
| 37 | 33.912 | 9.48 | 1.54072 | 47.2 |
| 38 | −22.646 | 0.10 | | |
| 39 | −36.033 | 1.20 | 1.65160 | 58.5 |
| 40 | 45.606 | 0.10 | | |
| 41 | 39.716 | 8.07 | 1.73800 | 32.3 |
| 42 | −26.727 | 1.20 | 1.92286 | 20.9 |
| 43 | −1863.408 | 88.12 | | |
| Image plane | ∞ | | | |

Various Kinds of Data

| | |
|---|---|
| Focal length | 820.00 |
| F-number | 5.90 |
| Half field angle | 1.51 |
| Image height | 21.64 |
| Total lens length | 437.08 |
| BF | 88.12 |

Lens Unit Data

| Unit | Starting surface | Focal length |
|---|---|---|
| 1 | 1 | 187.58 |
| 2 | 15 | −87.76 |
| 3 | 17 | −178.50 |

[Numeric Data 2]

Unit mm
Surface Data

| Surface number | r | d | nd | vd |
|---|---|---|---|---|
| 1 | 202.979 | 13.85 | 1.59349 | 67.0 |
| 2 | 1146.213 | 159.36 | | |
| 3 | 112.201 | 13.48 | 1.43387 | 95.1 |
| 4 | −294.589 | 0.08 | | |
| 5 | −285.813 | 2.03 | 1.80610 | 33.3 |
| 6 | 95.724 | 0.64 | | |
| 7 | 85.744 | 9.70 | 1.43387 | 95.1 |
| 8 | 383.200 | 41.51 | | |
| 9 | 80.052 | 5.75 | 1.80810 | 22.8 |
| 10 | 167.608 | 0.15 | | |
| 11 | 91.557 | 2.26 | 1.77250 | 49.6 |
| 12 | 45.827 | 10.97 | 1.43875 | 94.7 |
| 13 | 202.203 | 20.88 | | |
| 14(Aperture) | ∞ | 5.00 | | |
| 15 | 2486.000 | 2.00 | 1.59349 | 67.0 |
| 16 | 68.618 | 36.49 | | |
| 17 | 155.135 | 1.80 | 1.89286 | 20.4 |
| 18 | 60.697 | 5.22 | 1.70154 | 41.2 |
| 19 | −150.303 | 8.04 | | |
| 20 | 64.876 | 3.66 | 1.85478 | 24.8 |
| 21 | −242.070 | 1.45 | 1.61800 | 63.4 |
| 22 | 33.397 | 4.39 | | |
| 23 | −100.746 | 1.10 | 1.81600 | 46.6 |
| 24 | 149.076 | 5.00 | | |
| 25 | 48.596 | 3.17 | 1.74077 | 27.8 |
| 26 | −404.782 | 1.18 | | |
| 27 | 138.695 | 2.77 | 1.71736 | 29.5 |
| 28 | −130.959 | 0.86 | 1.92286 | 20.9 |
| 29 | 419.022 | 1.92 | | |
| 30 | −162.632 | 1.40 | 1.91082 | 35.2 |
| 31 | 79.849 | 6.02 | 1.53775 | 74.7 |
| 32 | −65.599 | 3.25 | | |
| 33 | −75.659 | 1.20 | 1.81600 | 46.6 |
| 34 | 55.017 | 10.05 | 1.65412 | 39.7 |
| 35 | −32.781 | 0.87 | | |
| 36 | −28.199 | 1.50 | 1.59522 | 67.7 |
| 37 | 33.147 | 9.51 | 1.51823 | 58.9 |
| 38 | −27.446 | 0.38 | | |
| 39 | −33.252 | 1.20 | 1.70300 | 52.4 |
| 40 | 82.476 | 0.30 | | |
| 41 | 69.620 | 8.05 | 1.71736 | 29.5 |
| 42 | −28.138 | 1.20 | 1.92286 | 20.9 |
| 43 | −103.166 | 140.36 | | |
| Imageplane | ∞ | | | |

Various Kinds of Data

| | |
|---|---|
| Focal length | 1180.10 |
| F-number | 8.00 |
| Half field angle | 1.05 |
| Image height | 21.64 |
| Total lens length | 550.00 |
| BF | 140.36 |

Lens Unit Data

| Unit | Starting surface | Focal length |
|---|---|---|
| 1 | 1 | 262.69 |
| 2 | 15 | −118.94 |
| 3 | 17 | −201.50 |

[Numeric Data 3]

Unit mm
Surface Data

| Surface number | r | d | nd | vd |
|---|---|---|---|---|
| 1 | 239.922 | 10.06 | 1.59349 | 67.0 |
| 2 | 7630.475 | 143.66 | | |
| 3 | 92.483 | 11.58 | 1.43387 | 95.1 |
| 4 | −609.787 | 0.07 | | |
| 5 | −571.874 | 1.85 | 1.80610 | 33.3 |
| 6 | 110.755 | 0.15 | | |
| 7 | 80.471 | 8.00 | 1.43387 | 95.1 |
| 8 | 268.516 | 29.41 | | |
| 9 | 74.041 | 3.77 | 1.92286 | 18.9 |
| 10 | 114.095 | 0.15 | | |
| 11 | 81.951 | 2.10 | 1.83481 | 42.7 |
| 12 | 40.678 | 10.10 | 1.43700 | 95.1 |
| 13 | 212.122 | 13.05 | | |
| 14(Aperture) | ∞ | 5.00 | | |
| 15 | 453.386 | 1.60 | 1.59522 | 67.7 |
| 16 | 67.582 | 36.49 | | |
| 17 | 250.519 | 1.30 | 1.89286 | 20.4 |
| 18 | 41.617 | 4.42 | 1.80610 | 33.3 |
| 19 | −260.662 | 8.04 | | |
| 20 | 69.888 | 4.44 | 1.66680 | 33.0 |
| 21 | −53.319 | 1.30 | 1.59522 | 67.7 |
| 22 | 42.907 | 3.59 | | |
| 23 | −112.551 | 1.10 | 1.77250 | 49.6 |
| 24 | 63.547 | 3.00 | | |
| 25 | 71.157 | 2.95 | 1.76182 | 26.5 |
| 26 | −3456.991 | 2.76 | | |
| 27 | 67.168 | 2.77 | 1.68893 | 31.1 |

-continued

| | | | | |
|---|---|---|---|---|
| 28 | −162.677 | 3.76 | 1.90043 | 37.4 |
| 29 | 110.060 | 1.06 | | |
| 30 | 146.490 | 1.40 | 1.90043 | 37.4 |
| 31 | 58.451 | 6.02 | 1.49700 | 81.5 |
| 32 | −64.196 | 3.25 | | |
| 33 | −101.733 | 1.20 | 1.75500 | 52.3 |
| 34 | 22.804 | 10.05 | 1.72047 | 34.7 |
| 35 | −33.199 | 0.87 | | |
| 36 | −26.967 | 1.50 | 1.69930 | 51.1 |
| 37 | 48.467 | 9.51 | 1.51742 | 52.4 |
| 38 | −24.871 | 0.38 | | |
| 39 | −35.800 | 1.20 | 1.61772 | 49.8 |
| 40 | 50.064 | 0.30 | | |
| 41 | 44.202 | 8.05 | 1.71736 | 29.5 |
| 42 | −27.006 | 1.20 | 1.92286 | 20.9 |
| 43 | −294.520 | 115.01 | | |
| Imageplane | ∞ | | | |

Various Kinds of Data

| | |
|---|---|
| Focal length | 1000.00 |
| F-number | 8.00 |
| Half field angle | 1.24 |
| Image height | 21.64 |
| Total lens length | 477.48 |
| BF | 115.01 |

Lens Unit Data

| Unit | Starting surface | Focal length |
|---|---|---|
| 1 | 1 | 215.09 |
| 2 | 15 | −133.64 |
| 3 | 17 | −103.47 |

[Numeric Data 4]

Unit mm
Surface Data

| Surface number | r | d | nd | vd |
|---|---|---|---|---|
| 1 | 148.873 | 15.64 | 1.59349 | 67.0 |
| 2 | 588.063 | 117.90 | | |
| 3 | 89.476 | 14.55 | 1.43700 | 95.1 |
| 4 | −297.675 | 0.20 | | |
| 5 | −288.374 | 2.10 | 1.80610 | 33.3 |
| 6 | 66.359 | 2.06 | | |
| 7 | 66.691 | 12.93 | 1.43700 | 95.1 |
| 8 | 14668.598 | 17.05 | | |
| 9 | 64.298 | 6.21 | 1.89286 | 20.4 |
| 10 | 132.593 | 0.32 | | |
| 11 | 69.442 | 2.72 | 1.83400 | 37.2 |
| 12 | 38.710 | 9.67 | 1.43875 | 94.7 |
| 13 | 95.465 | 9.65 | | |
| 14(Aperture) | ∞ | 4.50 | | |
| 15 | −477.364 | 1.90 | 1.61800 | 63.4 |
| 16 | 61.827 | 32.21 | | |
| 17 | 115.625 | 2.10 | 1.89286 | 20.4 |
| 18 | 72.037 | 7.20 | 1.53172 | 48.8 |
| 19 | −92.175 | 2.10 | | |
| 20 | 110.462 | 5.13 | 1.80610 | 33.3 |
| 21 | −136.740 | 1.60 | 1.53775 | 74.7 |
| 22 | 39.052 | 4.91 | | |
| 23 | −91.721 | 1.60 | 1.72916 | 54.7 |
| 24 | 73.953 | 6.75 | | |
| 25 | 87.265 | 6.00 | 1.65412 | 39.7 |
| 26 | −746.562 | 2.75 | | |
| 27 | 92.618 | 10.23 | 1.72047 | 34.7 |
| 28 | −56.836 | 2.10 | 1.80810 | 22.8 |
| 29 | −669.731 | 1.64 | | |
| 30 | 145.532 | 1.40 | 1.92286 | 20.9 |
| 31 | 64.398 | 6.12 | 1.49700 | 81.5 |
| 32 | −62.120 | 3.30 | | |
| 33 | −93.129 | 1.30 | 1.77250 | 49.6 |
| 34 | 21.107 | 10.15 | 1.71736 | 29.5 |
| 35 | −32.887 | 0.90 | | |
| 36 | −24.583 | 1.50 | 1.72916 | 54.7 |
| 37 | 38.446 | 9.51 | 1.54072 | 47.2 |
| 38 | −22.396 | 0.38 | | |
| 39 | −35.368 | 1.30 | 1.65160 | 58.5 |
| 40 | 45.856 | 0.30 | | |
| 41 | 38.488 | 8.05 | 1.73800 | 32.3 |
| 42 | −25.087 | 1.30 | 1.92286 | 20.9 |
| 43 | −714.778 | 87.88 | | |
| Image plane | ∞ | | | |

Various Kinds of Data

| | |
|---|---|
| Focal length | 780.00 |
| F-number | 5.90 |
| Half field angle | 1.59 |
| Image height | 21.64 |
| Total lens length | 437.12 |
| BF | 87.88 |

Lens Unit Data

| Unit | Starting surface | Focal length |
|---|---|---|
| 1 | 1 | 196.48 |
| 2 | 15 | −88.45 |
| 3 | 17 | −251.98 |

The following table indicates various numerical values relating to the above-described conditional inequalities (1) to (8) in each of the exemplary embodiments.

TABLE 1

| | | First exemplary embodiment | Second exemplary embodiment | Third exemplary embodiment | Fourth exemplary embodiment |
|---|---|---|---|---|---|
| Conditional inequality (1) | TL3/TL | 0.275 | 0.209 | 0.236 | 0.285 |
| Conditional inequality (2) | SD3/TL3 | 0.758 | 0.704 | 0.728 | 0.769 |
| Conditional inequality (3) | DM3/TL3 | 0.106 | 0.118 | 0.118 | 0.103 |
| Conditional inequality (4) | LD/f | 0.533 | 0.466 | 0.477 | 0.560 |
| Conditional inequality (5) | BF/LD | 0.202 | 0.255 | 0.241 | 0.201 |
| Conditional inequality (6) | f3/f | −0.218 | −0.171 | −0.103 | −0.323 |
| Conditional inequality (7) | vd3P | 81.5 | 74.7 | 81.5 | 81.5 |
| Conditional inequality (8) | nd3N | 1.923 | 1.923 | 1.923 | 1.923 |

Figure 1:
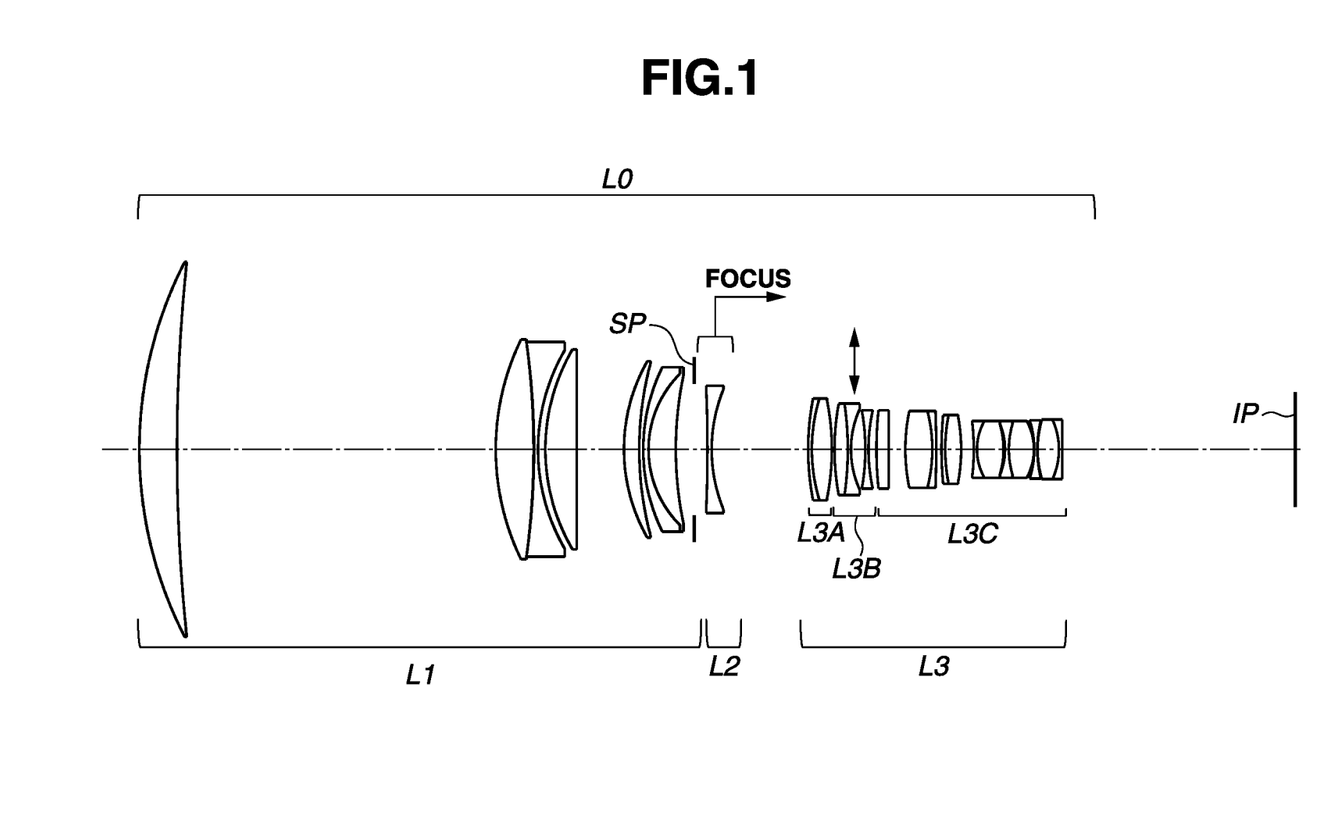
FIG. 1 is a cross-sectional view of an optical system at infinity focusing according to a first exemplary embodiment.
Figure 2:
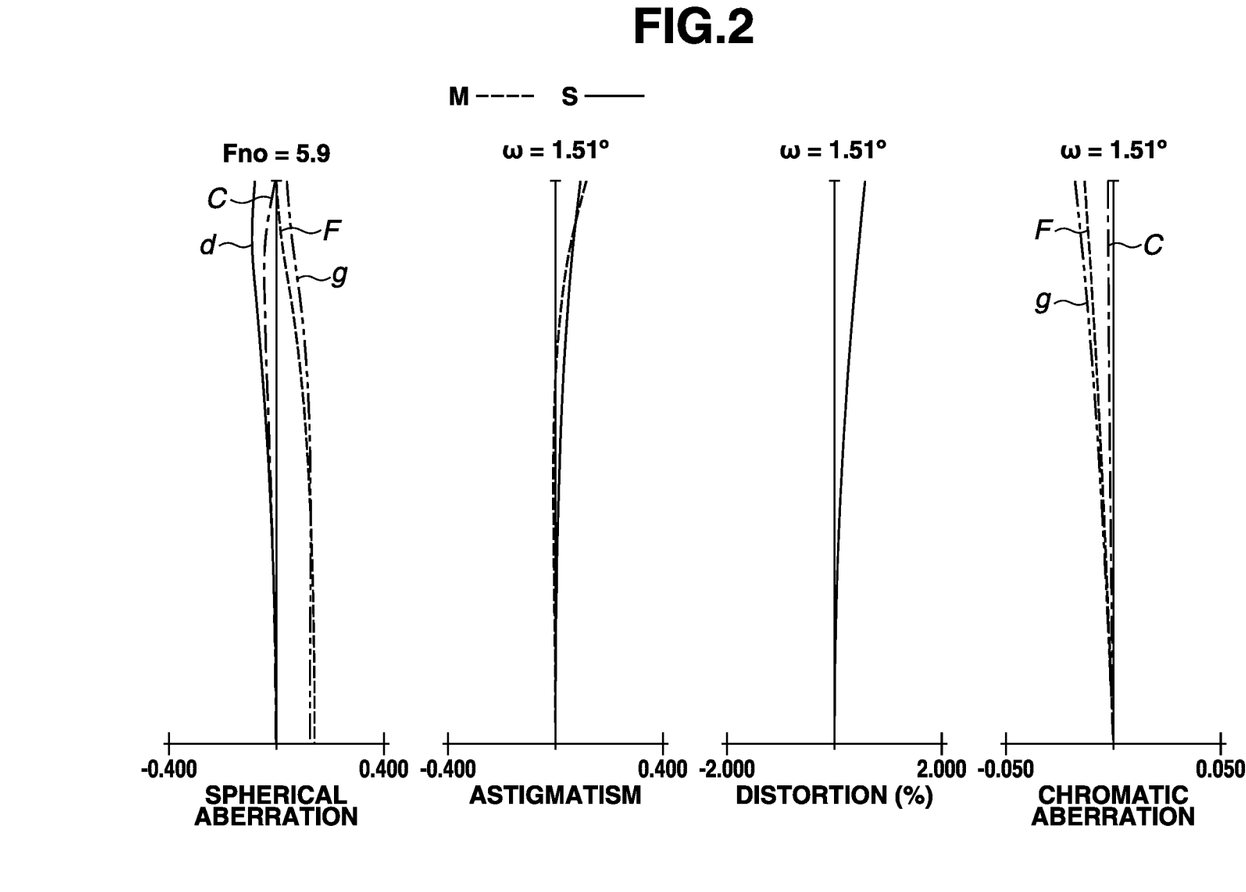
FIG. 2 is an aberration diagram of the optical system at infinity focusing according to the first exemplary embodiment.
Figure 3:
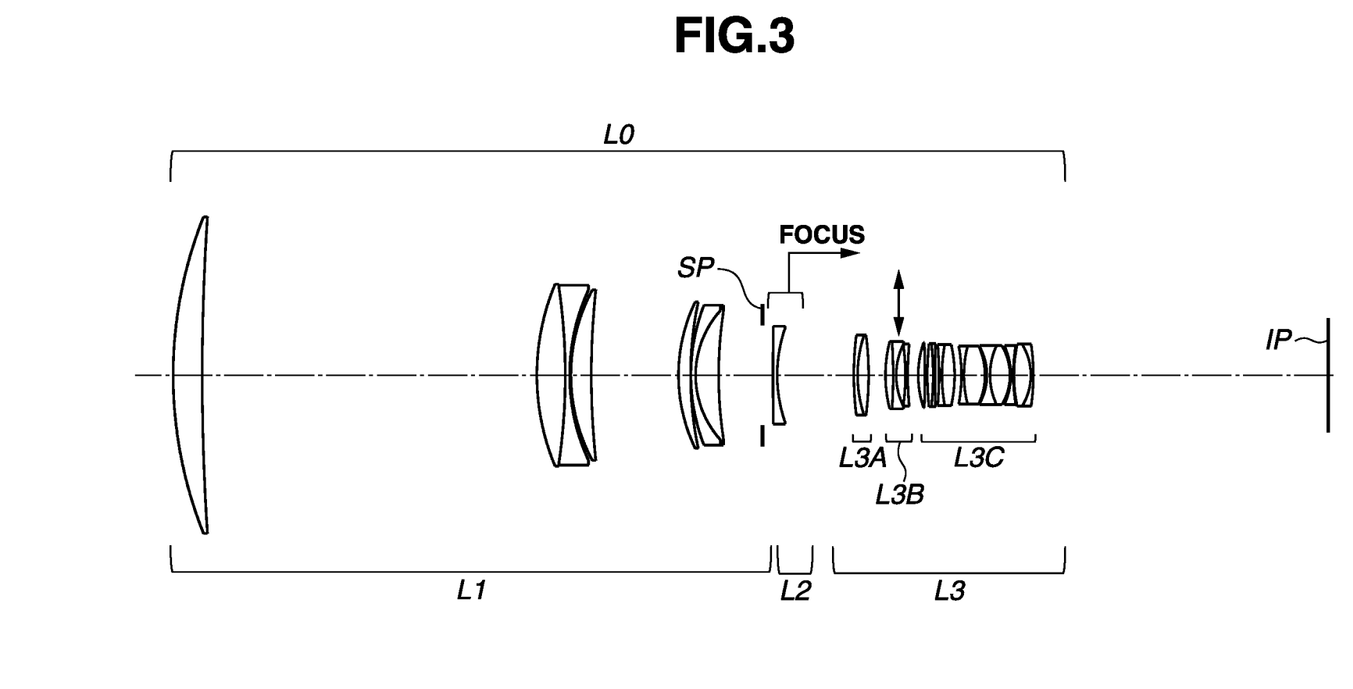
FIG. 3 is a cross-sectional view of an optical system at infinity focusing according to a second exemplary embodiment.
Figure 4:
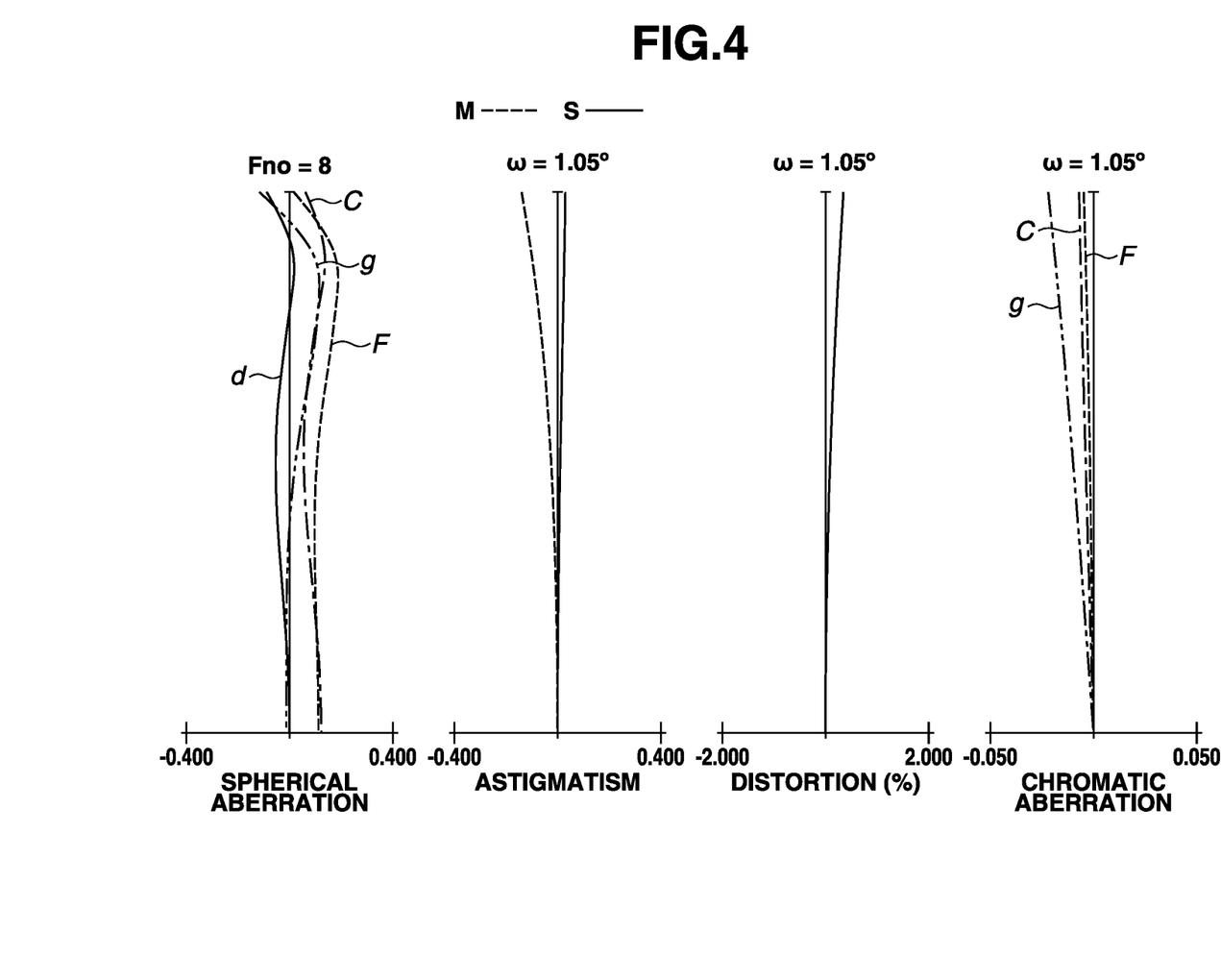
FIG. 4 is an aberration diagram of the optical system at infinity focusing according to the second exemplary embodiment.
Figure 5:
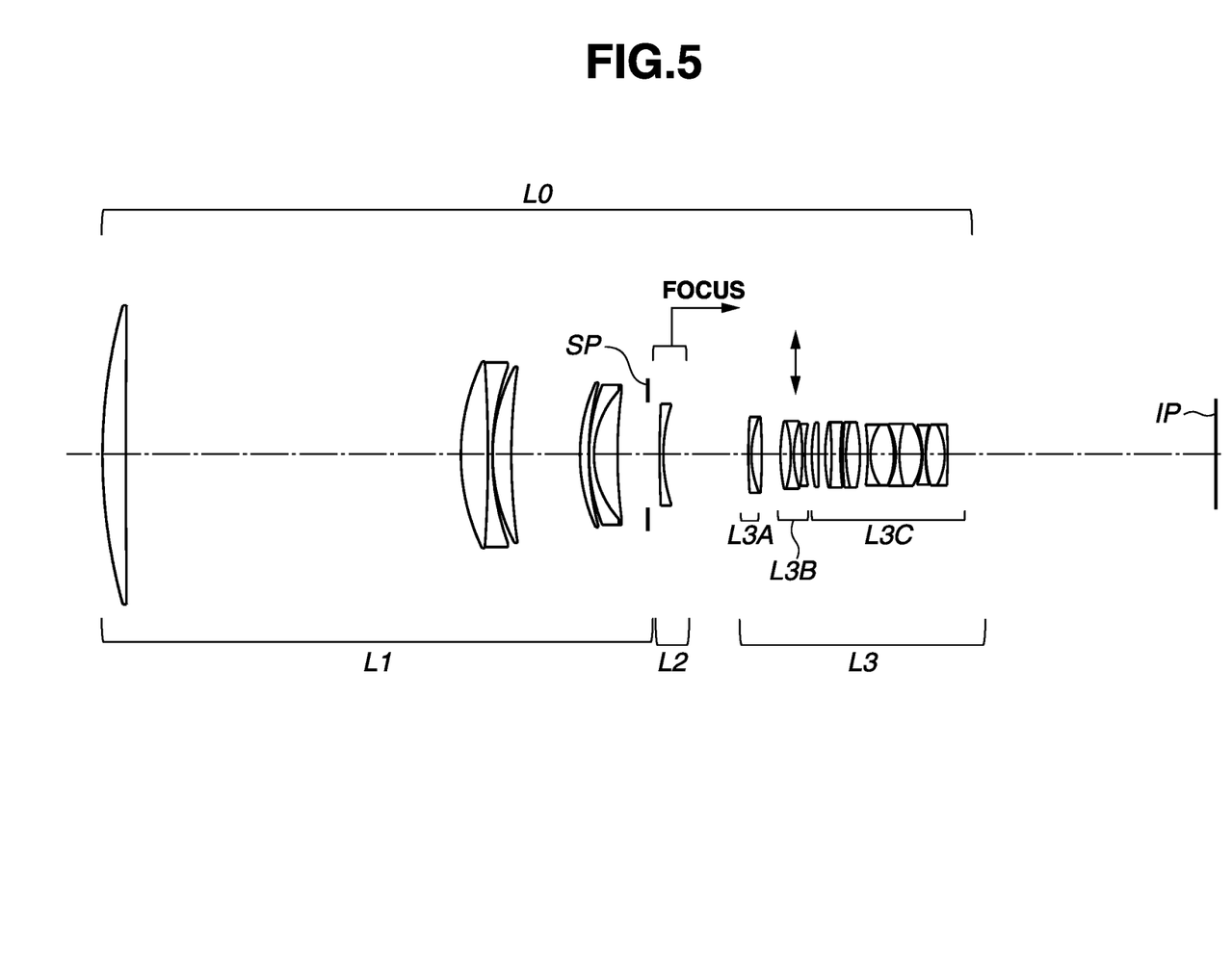
FIG. 5 is a cross-sectional view of an optical system at infinity focusing according to a third exemplary embodiment.
Figure 6:
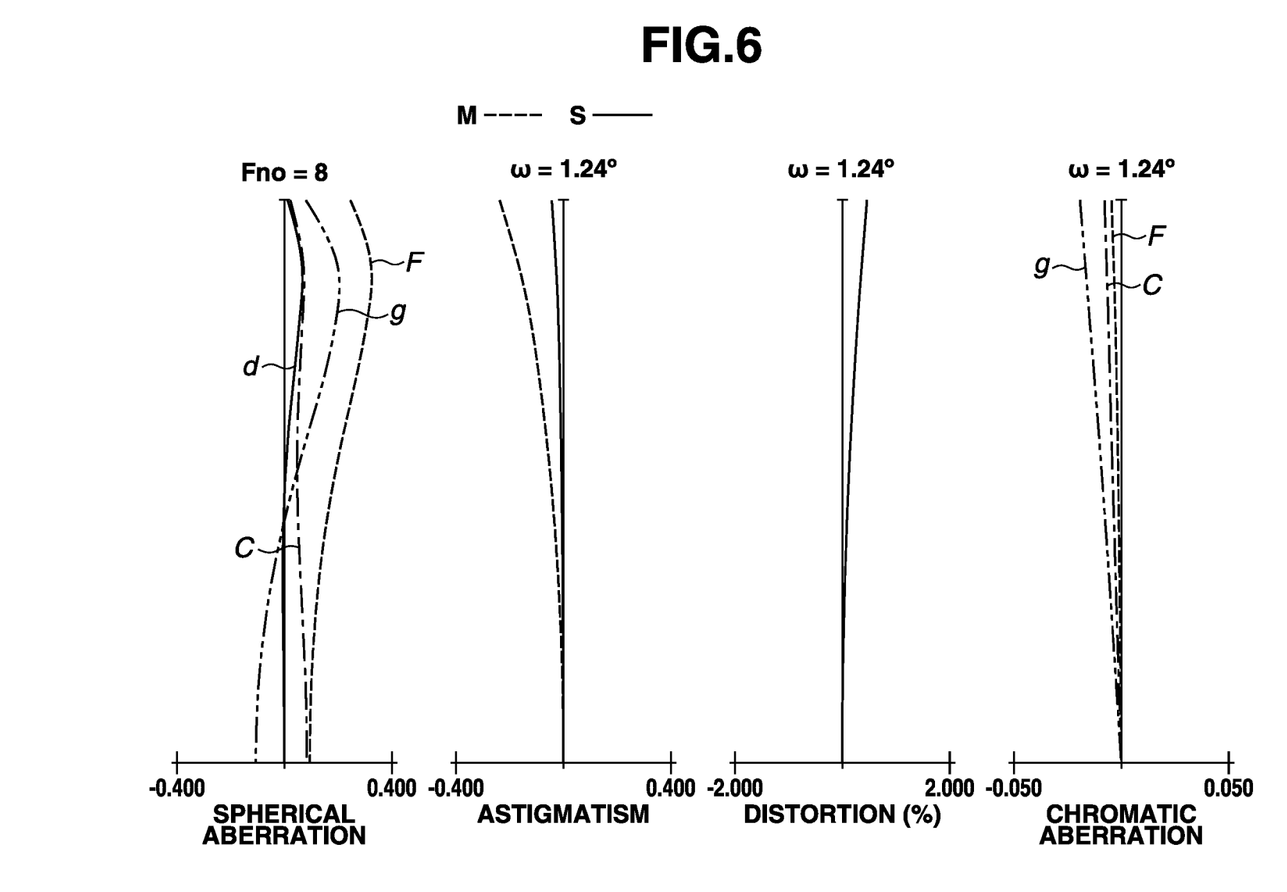
FIG. 6 is an aberration diagram of the optical system at infinity focusing according to the third exemplary embodiment.
Figure 7:
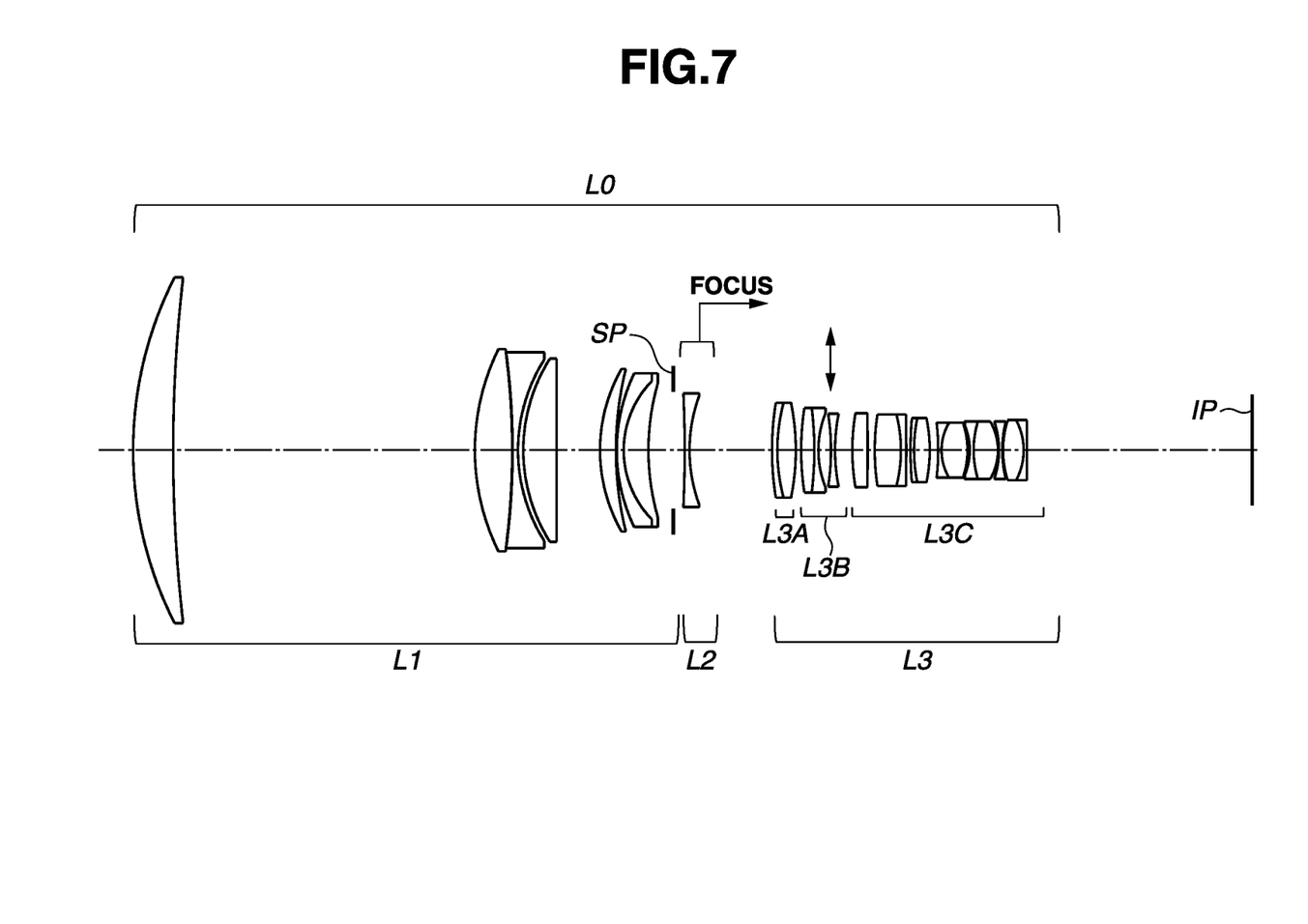
FIG. 7 is a cross-sectional view of an optical system at infinity focusing according to a fourth exemplary embodiment.
Figure 8:
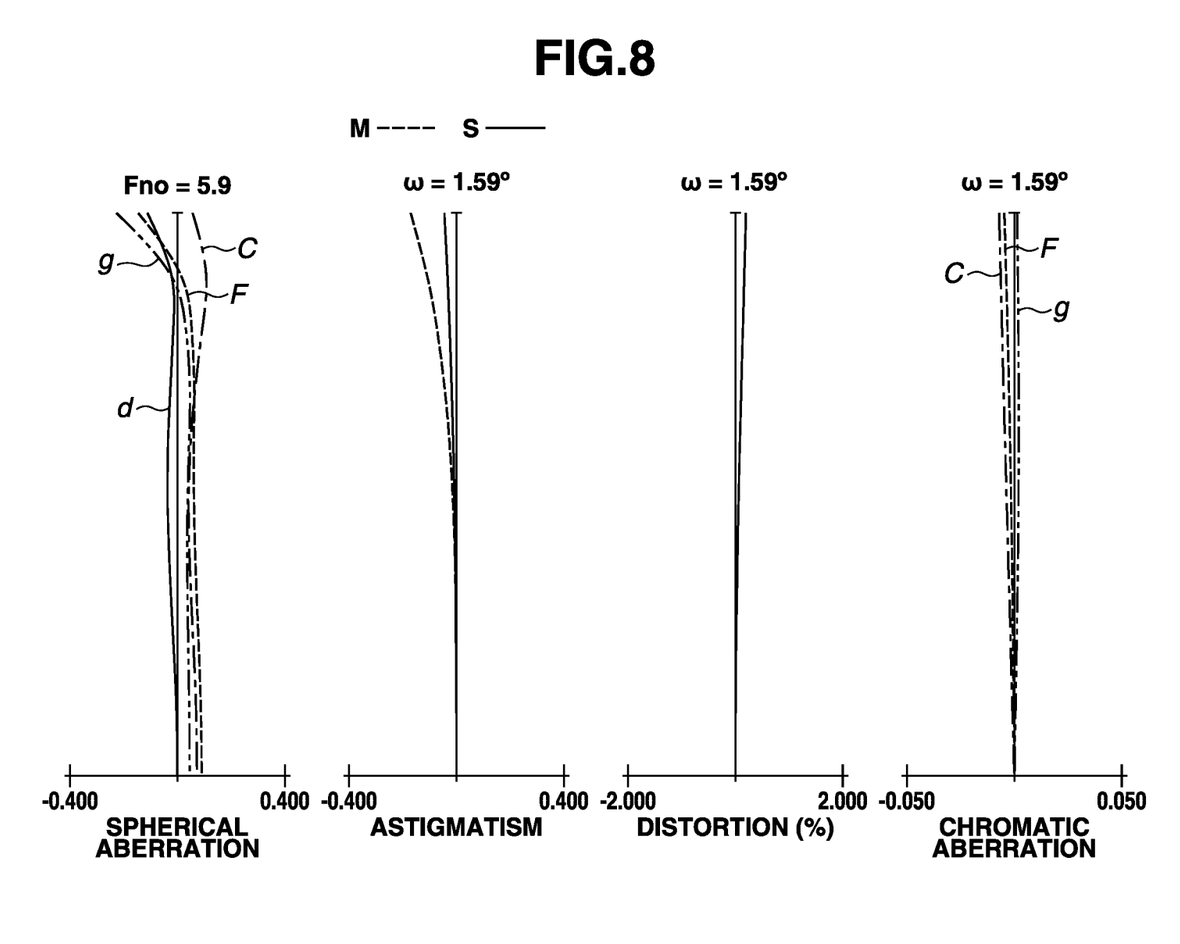
FIG. 8 is an aberration diagram of the optical system at infinity focusing according to the fourth exemplary embodiment.
Figure 9:
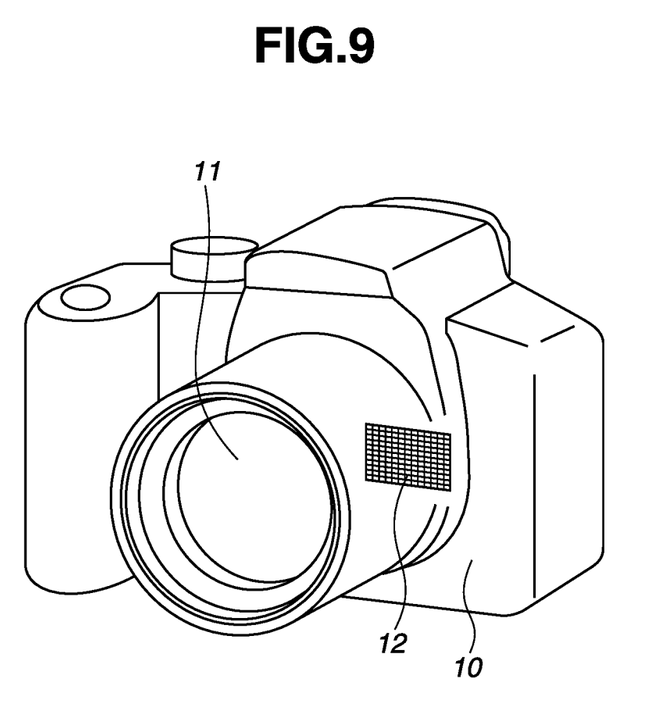
FIG. 9 is a schematic diagram of an imaging apparatus according to an exemplary embodiment.

FIG. 9 is a schematic diagram illustrating an imaging apparatus (a digital still camera) as an optical apparatus according to an exemplary embodiment of the present invention. The imaging apparatus according to the present exemplary embodiment includes a camera main body 10, an optical system 11, and an image sensor (a photoelectric conversion device) 12 that photoelectrically converts an image formed by the optical system 11. The optical system 11 is the optical system L0 according to any of the above-described exemplary embodiments, and is held by a holding member (a lens barrel). The image sensor 12 is a device that captures an image of an object by receiving light from the optical system 11, and can be a photoelectric conversion device such as a charge coupled device (CCD) sensor or a complementary metal-oxide semiconductor (CMOS) sensor.

The imaging apparatus according to the present exemplary embodiment is assumed to be a lens integrated camera in which the camera main body 10 and the optical system 11 are integrated, but may be a lens interchangeable camera. For example, an optical apparatus (a lens apparatus) in which the holding member holding the optical system 11 is detachably attached to the camera main body 10 serving as the imaging apparatus may be adopted. Further, the optical system according to each of the exemplary embodiments is applicable to various optical apparatuses such as a silver-halide film camera, a digital video camera, a telescope, binoculars, and a projector (a projection apparatus) without being limited to the above-described imaging apparatus.

While the exemplary embodiments and examples of the present invention have been described above, the present invention is not limited to the above-described exemplary embodiments and examples, and various combinations, modifications, and alternations can be made without departing from the spirit of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-008836, filed Jan. 24, 2022, which is hereby incorporated by reference herein in its entirety.

What is claimed is:

1. An optical system comprising a first lens unit having positive refractive power, a second lens unit having positive or negative refractive power and configured to move in focusing, and a third lens unit having negative refractive power that are arranged in order from an object side to an image side, wherein each distance between adjacent lens units changes in focusing, and wherein the optical system satisfies the following conditional inequalities:

$0.10 < TL3/TL < 0.40$, $0.70 < SD3/TL3 < 0.90$, $0.05 < DM3/TL3 < 0.14$, $-0.218 \leq f3/f < -0.10$, and $73 < vd3P < 97$ where TL is a distance on an optical axis from a lens surface closest to the object side to a lens surface closest to the image side, TL3 is a distance on the optical axis from a lens surface closest to the object side in the third lens unit to a lens surface closest to the image side in the third lens unit, SD3 is a sum of thicknesses, on the optical axis, of lenses in the third lens unit, DM3 is the largest of the thicknesses, on the optical axis, of the lenses in the third lens unit, f3 is a focal length of the third lens unit, f is a focal length of the optical system at infinity focusing, vd3P is an Abbe number of a lens based on a d-line, and the lens having the largest Abbe number based on the d-line among positive lenses included in the third lens unit.

2. The optical system according to claim 1, wherein the optical system satisfies the following conditional inequality:

$0.45 < LD/f < 0.80$, where LD is a distance on the optical axis from the lens surface closest to the object side to an image plane.

3. The optical system according to claim 1, wherein the optical system satisfies the following conditional inequality:

$0.15 < BF/LD < 0.27$, where BF is a distance on the optical axis from the lens surface closest to the image side to an image plane, and LD is a distance on the optical axis from the lens surface closest to the object side to the image plane.

4. The optical system according to claim 1, wherein the optical system satisfies the following conditional inequality:

$1.85 < nd3N < 2.2$, where nd3N is a refractive index of a lens relative to a d-line, the lens having the largest refractive index relative to the d-line among negative lenses included in the third lens unit.

5. The optical system according to claim 1,
wherein the third lens unit includes a first subunit, a second subunit, and a third subunit that are arranged in order from the object side to the image side,
wherein the first subunit and the third subunit are configured not to move in image blur correction, and
wherein the second subunit is configured to move in a direction containing a component in a direction perpendicular to the optical axis in the image blur correction.

6. The optical system according to claim 5, wherein the first subunit has positive refractive power.

7. The optical system according to claim 5, wherein the second subunit has negative refractive power.

8. The optical system according to claim 5, wherein the third subunit has negative refractive power.

9. The optical system according to claim 1, wherein the second lens unit has negative refractive power.

10. The optical system according to claim 9, wherein the second lens unit is configured to move to the image side in focusing from an infinity side to a short distance side.

11. The optical system according to claim 1, wherein the second lens unit consists of one lens.

12. The optical system according to claim 1, wherein, among distances on the optical axis between two adjacent lenses in the optical system, a distance between a lens closest to the object side and a lens adjacent thereto is largest.

13. The optical system according to claim 1, wherein the first lens unit and the third lens unit are configured not to move in focusing.

14. The optical system according to claim 1, wherein an aperture stop is disposed between the first lens unit and the second lens unit.

15. An imaging apparatus comprising:
an optical system; and
an image sensor configured to capture an image of an object through the optical system,
wherein the optical system includes a first lens unit having positive refractive power, a second lens unit having positive or negative refractive power and configured to move in focusing, and a third lens unit having negative refractive power that are arranged in order from an object side to an image side,
wherein each distance between adjacent lens units changes in focusing, and wherein the optical system satisfies the following conditional inequalities:

$$0.10 < TL3/TL < 0.40,$$

$$0.70 < SD3/TL3 < 0.90,$$

$$0.05 < DM3/TL3 < 0.14,$$

$$-0.218 \leq f3/f < -0.10, \text{ and}$$

$$73 < vd3P < 97,$$

where TL is a distance on an optical axis from a lens surface closest to the object side to a lens surface closest to the image side, TL3 is a distance on the optical axis from a lens surface closest to the object side in the third lens unit to a lens surface closest to the image side in the third lens unit, SD3 is a sum of thicknesses, on the optical axis, of lenses in the third lens unit, DM3 is the largest of the thicknesses, on the optical axis, of the lenses in the third lens unit, f3 is a focal length of the third lens unit, f is a focal length of the optical system at infinity focusing, vd3P is an Abbe number of a lens based on a d-line, and the lens having the largest Abbe number based on the d-line among positive lenses included in the third lens unit.

16. An optical system comprising a first lens unit having positive refractive power, a second lens unit having positive or negative refractive power and configured to move in focusing, and a third lens unit having negative refractive power that are arranged in order from an object side to an image side, wherein each distance between adjacent lens units changes in focusing, wherein, among distances on the optical axis between two adjacent lenses in the optical system, a distance between a lens closest to the object side and a lens adjacent thereto is largest, and wherein the optical system satisfies the following conditional inequalities:

$$0.10 < TL3/TL < 0.40,$$

$$0.70 < SD3/TL3 < 0.90,$$

$$0.05 < DM3/TL3 < 0.14, \text{ and}$$

$$-0.218 \leq f3/f < -0.10,$$

where TL is a distance on an optical axis from a lens surface closest to the object side to a lens surface closest to the image side, TL3 is a distance on the optical axis from a lens surface closest to the object side in the third lens unit to a lens surface closest to the image side in the third lens unit, SD3 is a sum of thicknesses, on the optical axis, of lenses in the third lens unit, DM3 is the largest of the thicknesses, on the optical axis, of the lenses in the third lens unit, f3 is a focal length of the third lens unit, and f is a focal length of the optical system at infinity focusing.

* * * * *